United States Patent Office 3,016,309
Patented Jan. 9, 1962

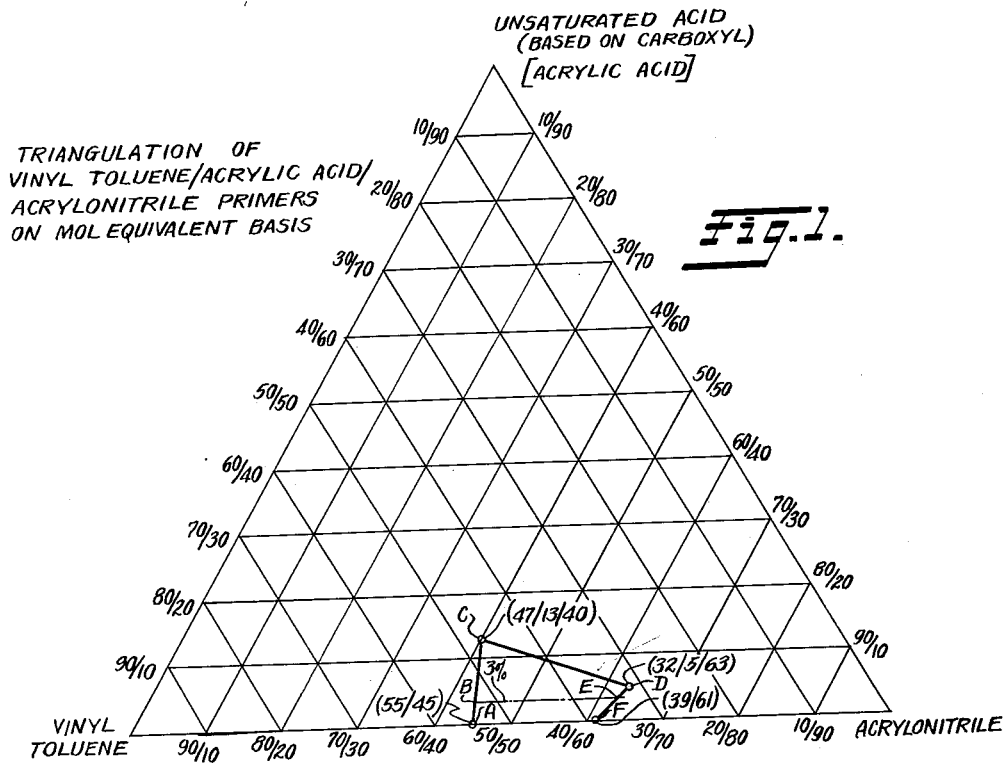
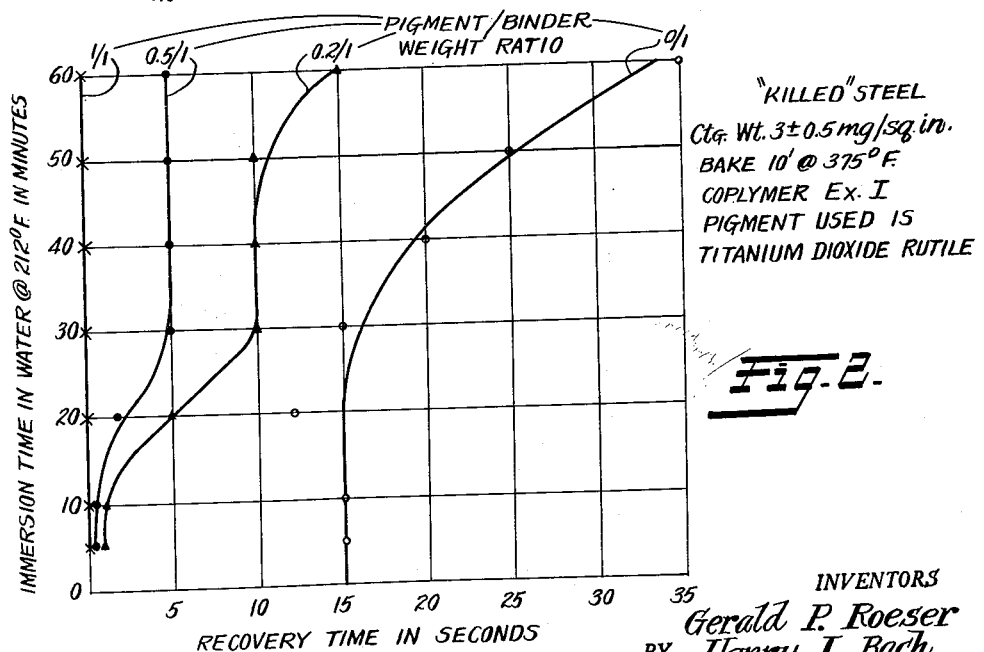

3,016,309
TRIPOLYMER PRIMER FOR VINYL RESIN DISPERSIONS AND STEEL COATED WITH A FILM THEREOF
Gerald P. Roeser, Lahaska, and Henry J. Bach, Mount Lebanon Township, Allegheny County, Pa., assignors to American Marietta Company, Stoner-Mudge Co. Division, Chicago, Ill., a corporation of Illinois
Filed Dec. 9, 1958, Ser. No. 779,082
22 Claims. (Cl. 117—75)

The present invention relates to primers and more particularly to primers which are useful for bonding vinyl resin plastisols and organosols to a metal base such as iron or steel which may be treated with acid, e.g., phosphoric acid, or galvanized. The metal is desirably in the form of a sheet but steel or iron members of any form may be used, e.g., bars, rods, pipes, printing roll cores, tubes, etc.

In accordance with the present invention, primer compositions are provided by copolymerizing monomer components consisting essentially of vinyl toluene, acrylonitrile and from 0–13 mol equivalent percent based on carboxyl radical of an ethylenically unsaturated carboxylic acid selected from the group consisting of acrylic acid, methacrylic acid and itaconic acid.

In accordance with the present invention, it has been found that copolymers prepared by solvent solution polymerization, preferably in the presence of a free-radical polymerization catalyst, and constituted by the monomer components set forth above in amounts falling within a narrow and critical range enables the preparation of primer compositions which are uniquely superior in providing excellent adhesion both to the steel substrate and also to a plastisol or organosol topcoat and enable the coated base to be extensively fabricated without separation of the topcoat from the steel base. Preferred compositions in accordance with the invention are those which contain at least approximately 3 mol equivalent percent of acid component (based on the carboxylic acid content of the acid monomer). Particularly preferred primer compositions are provided when the copolymer additionally contains a substantial proportion of a selected class of pigments, preferably illustrated by titanium dioxide and by lead oxide. Through the use of acid, preferably together with pigment, as indicated, primer compositions may be formulated possessing superior resistance to water at elevated temperature, e.g., boiling water. Additionally, the presence of from 5–60% of talc based on the total weight of pigment and talc provides improved resistance to attack upon immersion in salt and detergent solutions.

Referring more particularly to the monomer components of the new polymers which are provided in accordance with the invention, it is essential that the copolymer include from 32–55 mol percent of vinyl toluene. Other similar ethylenically unsaturated esters typified by styrene have been found to be inadequate, in that adhesion between the plastisol and/or organosol topcoat and the copolymer containing styrene instead of vinyl toluene is wholly unsatisfactory. More particularly, adhesion to the plastisol or organosol topcoat in accordance with the invention is substantially perfect whereas, when styrene is used, adhesion falls to substantially zero (substantially no adhesion is achieved).

The second essential component in accordance with the invention is acrylonitrile. This component should be present in the copolymer in proportions of from about 40–63 mol percent.

Various ethylenically unsaturated acids having a terminal methylene group may be employed. It has been found that acrylic acid, methacrylic acid and itaconic acid may be used in accordance with the invention, acrylic acid being preferred. The acid component may be entirely absent in accordance with the invention, in which event boiling water resistance is sacrificed and the proportions of vinyl toluene and acrylonitrile must be adjusted within the limits previously set forth. The maximum proportion of acid which may be present is 13 mol equivalent percent, this maximum proportion of acid assuming the utilization of a minimum proportion of acrylonitrile, e.g., 40 mol percent. It should be particularly observed that acrylic acid and methacrylic acid are monocarboxylic acids, whereas itaconic acid is a di-carboxylic acid.

As will be evident from the discussion which has been presented above, the proportions which are useable in accordance with the invention are not simply interrelated. Accordingly, the proportions which can be used have been graphically set forth in the triangulation accompanying the present application. The proportions of monomers which may be employed in the copolymer are within the closed area A—C—D—F—A. Preferably, and for the purpose of providing improved resistance to boiling water as well as superior capacity to withstand extensive fabrication, a minimum proportion of the acid component is present in the copolymer as defined by the line B—D. Accordingly, preferred copolymers in accordance with the invention are within the closed area B—C—D—E—B.

The monomer components specified may be replaced in an amount up to 25% by weight of the component with other similiar materials. Thus, vinyl toluene may be replaced by up to 25% of other α,β-monoethylenically unsaturated monomers such as various acrylate and/or methacrylate esters such as ethyl acrylate or ethyl methacrylate or by other vinyl aromatic compounds such as styrene or by various vinyl pyridines such as vinyl pyridine per se. Similarly, up to 25% of the acid component may be any monoethylenically unsaturated acid such as crotonic acid, maleic acid, fumaric acid or acid esters such as monobutyl maleate. Other monoethylenically unsaturated nitriles such as methacrylonitrile may replace up to 25% of the acrylonitrile component. The monomers indicated to be tolerable above are preferably absent from the copolymer.

The copolymers of the invention are of relatively low molecular weight measured by relative viscosity of from 1.4 to 3.5, preferably from 1.6 to 2.8. Below relative viscosity of 1.4, films of the copolymer lack integrity. Above 3.5, solvent solutions of the copolymer are too viscous to be applied. The relative viscosity referred to is measured in a solution of 1 gram of copolymer dissolved in 100 millimeters of dimethyl formamide solvent at 25° C. The relative viscosity is determined in an Ostwald-Fenske viscosimeter and is computed as follows:

$$\text{Relative viscosity} = \frac{\text{Solution efflux time}}{\text{Solvent efflux time}}$$

Copolymers having the molecular weight specified above are desirably provided by solvent solution polymerization. Other polymerization processes such as emulsion polymerization and polymerization in bulk normally produce copolymers of excessive molecular weight. However, these other polymerization processes may be used when modified or regulated to provide copolymers having the molecular weight specified.

By solvent solution polymerization is meant that the specified monomers in substantially the proportions desired in the copolymer are polymerized while in solution in a solvent medium which retains the copolymer which is formed in solution. The copolymers so produced are of lower molecular weight than can normally be obtained by other polymerization processes, e.g., emulsion polymerization or polymerization in bulk. The higher molecular weight copolymers do not provide satisfactory primers for vinyl plastisols and organosols.

The solvent solution polymerization is desirably conducted in the presence of a free-radical polymerization catalyst at temperatures above 50° C. and preferably at temperatures from 75–95° C. The time of reaction may vary from about ½ hour to about one day depending on temperature and yield desired. At preferred temperature of about 80° C. and in the presence of about 1–2% of benzoyl peroxide catalyst based on total monomer, the reaction is desirably effected in a time period of from about 3 to 12 hours. In practice, and under preferred conditions, substantially quantitative yields are obtained in about 8 hours.

Any free-radical polymerization catalyst may be employed. Thus, organic and inorganic peroxides may be used. As is well known, benzoyl peroxide is representative of a large class of organic peroxides which are suitable free radical polymerization catalysts and benzoyl peroxide is the preferred member of the class. Azo catalysts such as azodiisobutyronitrile are also usable.

Preferred copolymers in accordance with the invention possess a minimum fusion temperature of from 220–250° F., minimum fusion being tested by coating aluminum foil with a 5 mg. per square inch coating of the copolymer, baking for 10 minutes at 350° F., followed by placing two strips of coated foil with the coatings face-to-face in a heat sealer and pressing at 40 lbs./sq. in., at various temperatures until the coating sticks to itself after the application of heat and pressure for a period of 5 seconds.

Any of the conventional vinyl plastisols and organosols, using vinyl chloride homopolymers or copolymers of vinyl chloride with minor proportions of vinyl acetate or vinylidene chloride may be utilized in the present invention. The invention is particularly directed to plastisols containing polymers and copolymers comprising at least 85% by weight of vinyl chloride and of molecular weight above about 20,000. Thus, polyvinyl chloride per se may be employed as well as copolymers comprising vinyl chloride with a minor proportion of about 10% or less of vinyl acetate or vinylidene chloride.

Exemplary vinyl resins for use in plastisols and organosols for the formulation of topcoats in accordance with the present invention are those sold under various trade designations. Reference is made to the B. F. Goodrich Chemical Company Service Bulletin No. PR-3 dated June 1954 which contains examples of dispersions and their use.

As is conventional, the plastisols and organosols may be pigmented and may include fillers as well as various plasticizers and stabilizers without detracting from the superior adhesion which is achieved utilizing the primers of the present invention. Suitable weight ratios of dispersion resin to plasticizer are from 30/70 to 72/28. In organosols a higher ratio of dispersion resin to plasticizer up to about 95/5 may be used.

The primers of the present invention are applied to the steel substrate from solvent solution medium. Preferred solvents for the copolymers of the invention are active solvents such as aliphatic ketones illustrated by methyl ethyl ketone, cycloaliphatic ketones such as cyclohexanone and other active solvents for vinyl resins such as dimethyl formamide. Other active solvents which may be employed are methyl isobutyl ketone, diacetone alcohol, 2-methoxy ethanol or any of the alkyl Cellosolves such as methyl and ethyl Cellosolve. The solvent medium may include a proportion of liquid mononuclear aromatic solvent such as benzene, toluene and the various xylenes.

The proportion of copolymer to solvent medium may be varied to suit the manner in which the solutions of the invention are to be applied, i.e., by brushing, spraying, dipping, roll coating, etc. Particularly desirable thinners are (1) 50/50 methyl ethyl ketone/dimethyl formamide and (2) cyclohexanone. Cyclohexanone is of particular value in improving flow characteristics. The primers of the invention are desirably applied in solvent medium containing from about 20 to about 40% by weight of total solids, these solids include the resin solids constituted by the copolymers of the invention as well as dispersed inorganic pigment component.

The invention is illustrated in the examples which follow:

EXAMPLE I

A preferred copolymer in accordance with the present invention is prepared by dissolving 77 parts of vinyl toluene, 5 parts of glacial acrylic acid and 45 parts of acrylonitrile in 150 parts of methyl ethyl ketone. The solution so produced was heated to 80° C. and maintained at this temperature for a ten-hour period. During the ten-hour reaction period, a total of 2 parts of benzoyl peroxide polymerization catalyst was added in equal increments at 0, 2, 4 and 6 hours.

At the end of the ten-hour reaction period, a 98% conversion of monomer to copolymer had been achieved, the copolymer having a viscosity of 31 seconds in a 25% solids solution in methyl ethyl ketone/dimethyl formamide in weight ratio 3/1. The copolymer possessed a relative viscosity, measured in the manner defined hereinbefore of 1.65.

During the copolymerization in the presence of methyl ethyl ketone solvent, a cloud appeared at the end of the copolymerization reaction. This cloud was eliminated by the addition of dimethyl formamide at the end of the copolymerization reaction.

EXAMPLE II

The copolymer of Example I in a 44% resin solids solution in methyl ethyl ketone/dimethyl formamide in a weight ratio of 3/1 and having a viscosity of 10,000–15,000 centipoises was incorporated in a primer composition containing the following components.

| Component: | Parts by weight |
| --- | --- |
| Titanium dioxide rutile | 10.01 |
| Copolymer solution (44%) | 41.27 |
| Methyl ethyl ketone | 19.04 |
| Dimethyl formamide | 29.68 |
| Total | 100.00 |

The above primer composition contained 28.17% total solids and a pigment to binder weight ratio of 0.55/1. The primer had a density of 8.36 pounds per gallon and a viscosity measured in a No. 4 Ford Cup at 80° F. of from 20–30 seconds.

EXAMPLE III

The primer of Example II was roller coated upon a strip of toluene degreased "killed" steel sheet ("killed" steel is a well known type of steel in which a small amount of degassing agent such as ferrosilicon alloy is added to enhance the capacity of the steel to withstand mechanical deformation) and the coating was then baked for 10 minutes at 400° F. to provide a film having a dry coating weight of from 3–5 milligrams per square inch.

When viscosity adjustment is desired, the thinner which may desirably be added is a 50/50 weight ratio mixture of methyl ethyl ketone and dimethyl formamide.

EXAMPLE IV

The coated strip provided by Example III was reverse roll coated with a plastisol to provide a vinyl resin coating which was cured for 8 minutes at 350° F. in order to fuse the coating to the base. The plastisol employed contained 100 pounds of polyvinyl chloride resin (stir-in dispersion), 80 pounds of diisooctyl phthalate and 1 pound of dibutyl tin maleate.

Adhesion was tested by extending the strip 30% and then scratching the coating with a knife to provide a free edge which can be grabbed and pulled. Adhesion is noted by the extent of separation of the coated film from either the base or the primer. Zero adhesion is represented by complete removal of either the topcoat or the topcoat together with the primer as a continuous film none of which remains adhered to the underlying steel substrate. On the other hand, perfect adhesion represents a complete inability to separate the coated film from either the steel substrate or the layer of primer. Applying this test to the coated product of the present example, adhesion was perfect.

The present example was repeated with application of the primer by spraying and brushing, the results being identical in each instance.

EXAMPLE V

Example IV was repeated using in place of the polyvinyl chloride dispersion resin-containing plastisol of Example IV a similar plastisol containing a corresponding weight of a copolymer of 90% vinyl chloride with 10% vinylidene chloride, the dispersion resin being again of the stir-in type. The results obtained were identical with those reported in Example IV, the perfect adhesion of the primer to the base and also of the topcoat to the primer being achieved as indicated by the scratch-pull test following extension of the coated strip to an extent of 30%.

Table I which follows illustrates the criticality of the proportions employed in accordance with the invention.

Table I[1]

| Copolymer Components [2] | | | Primer Ctg. Wt. (Mg./sq. in.) | Topcoat Thickness (mils) | Impact Resistance [3] |
|---|---|---|---|---|---|
| Vinyl Toluene | Acrylic Acid | Acrylonitrile | | | |
| 77 (50.6) | 5 (5.4) | 30 (44.0) | 3-5 | 9-11 | 10 |
| 77 (41.5) | 5 (5.5) | 45 (54.0) | 3-5 | 9-11 | 10 |
| 77 (53.5) | ------ | 30 (46.5) | 3-5 | 9-11 | 10 |
| 50 (31.0) | ------ | 50 (69.0) | 3-5 | 9-11 | 0 |
| 77 (65.0) | 5 (6.8) | 15 (28.2) | 3-5 | 9-11 | 3 |
| 77 (39.8) | 10 (8.4) | 45 (51.8) | 3-5 | 9-11 | 10 |

[1] Primer of Example II applied to "killed" steel as in Example III, and the topcoat was the plastisol of Example V.
[2] Proportion listed in parts by weight (all components prepared as indicated in Examples I and II). Mol percent is set forth in parentheses.
[3] Impact resistance measured by subjecting the coated sheet to 20 bumps delivered by a one pound weight dropped from a height of 3 feet upon the uncoated surface of the sheet, resistance being measured on a scale of 0–10, 10 being perfect as indicated by no separation over the full 20 bump test.

EXAMPLE VI

Example I was repeated employing 30 parts of acrylonitrile instead of 45 parts and in place of methyl ethyl ketone a 65/35 weight ratio of xylol/dimethyl formamide was employed. At the end of the ten hour-80° C. reaction period, 99% conversion of monomer to copolymer had been achieved. Upon dilution of the copolymer-containing solution to 25% solids by addition of a 65/35 weight ratio mixture of xylol/dimethyl formamide, the solution so produced had a viscosity of 76 seconds measured in a No. 4 Ford Cup at 80° F.

The copolymer of the present example was employed in a primer composition by diluting the 24% resin solids solution with 65/35 xylol/dimethyl formamide after incorporation of 10% by weight of titanium dioxide rutile, dilution being effected to provide a primer having a viscosity of from 20–30 seconds measured in a No. 4 Ford Cup at 80° F.

Upon application of primer and topcoats as specified in Examples III, IV and V, perfect adhesion was achieved.

EXAMPLE VII

Example I was repeated employing 77 parts of vinyl toluene and 30 parts of acrylonitrile which are dissolved in 100 parts of methyl ethyl ketone. At the completion of the ten hour-80° C. reaction, a conversion of monomer to copolymer was achieved and the product had a viscosity of 22 seconds at 24% solids in methyl ethyl ketone solvent.

Upon dilution with methyl ethyl ketone after addition of 10% of titanium dioxide pigment, dilution being effected to provide a viscosity from 20–30 seconds as measured in a No. 4 Ford Cup at 80° F., a primer was provided which when applied as described in Example III and then topcoated as in Examples IV and V provided perfect adhesion.

It will be understood that the primers of the invention are particularly adapted for use on a steel base, "killed" steel being employed to illustrate the invention. Other steels such as blackplate or pail stock are also well adapted for use in the invention.

The criticality of vinyl toluene selected in accordance with the invention is illustrated in Table II which presents a comparison with comparable styrene-containing copolymers.

Table II

| Copolymer Components [2] | | | Primer Ctg. Wt. (mg./sq. in.) | Topcoat Thickness (mils) | Dry Adhesion [1] |
|---|---|---|---|---|---|
| Styrene | Acrylic Acid | Acrylonitrile | | | |
| (50.6) 68 | (5.4) 5 | (44.0) [3] 30 | 3.2 | 8 | 0 |
| (41.5) 68 | (5.5) 5 | (54.0) [3] 45 | 3.2 | 9 | 0 |
| 68 | 5 | [4] 30 | 3.4 | 11 | 0 |
| 68 | 5 | [4] 45 | 3.4 | 9 | 0 |
| Vinyl Toluene | | | | | |
| (41.5) 77 | (5.5) 5 | (54.0) [3] 45 | 3.2 | 11 | 10 |
| 77 | 5 | [4] 45 | 3.4 | 11 | 10 |

[1] Dry adhesion measured by scratch-pull test after 30% elongation of coated base—failure reported is between topcoat and primer.
[2] Proportions listed in parts by weight.
[3] Copolymer produced as taught in Example I and formulated into primer as in Example II without addition of pigment.
[4] See [3] except with addition of titanium dioxide rutile pigment to provide pigment/binder weight ratio of .55/1.

Note.—Each primer was barcoated on toluol washed "killed" steel and baked at 400° F. for 10 minutes. The topcoat was as specified in Example IV and baked at 400° F. for 10 minutes.

The primer compositions of the invention are substantially benefited by the inclusion of from 0.1–1.5 parts per part of resin of a metal oxide pigment such as, particularly, titanium dioxide, one important attribute of inorganic pigment particle addition being improved boiling water resistance.

When the coated products of the invention are immersed in boiling water, adhesion may be affected and there may be a period of time after removal of the coated product from the water before perfect adhesion as measured by the scratch-pull test is regained. The time of recovery varies both with the time of immersion in boiling water and also with the proportion of pigment which is present.

Substantially improved boiling water resistance is obtained using pigment in a pigment to binder weight ratio of 0.1/1. Preferred results are obtained using a pigment to binder weight ratio of from 0.15/1 to 1.1/1. Up to about 1.5 parts of pigment per part of copolymer binder may be used, but excessive pigment proportions impair flexibility and are less desirable for this reason.

The improved boiling water resistance which is achieved is illustrated in FIG. 2 in which the recovery time in seconds is compared with the immersion time in boiling water for a plurality of representative primers corresponding to the primer of Example II but in which the proportion of titanium dioxide rutile pigment is varied. The specific weight ratio of titanium dioxide pigment to copolymer binder for each series of experiments is identified in the graph.

Substantially comparable results to those set forth in FIG. 2 are achieved using lead oxide in corresponding weight ratios instead of titanium dioxide.

Desirably, up to 80% by weight of talc based on the weight of the titanium dioxide or lead oxide pigment is added to the primer composition. A particularly preferred weight ratio of pigment to talc is about 60/40 and the salt water/detergent resistance of the primer of Example II may be improved by this modification.

Thus, improved salt water/detergent solution resistance is achieved by modifying the primer of Example II to include 6 parts of titanium dioxide rutile and 4 parts of talc in place of the 10.01 parts of titanium dioxide rutile specified in Example II.

The invention is defined in the claims which follow.

We claim:

1. A primer for vinyl resin dispersions comprising an organic solvent solution of a copolymer of monomer components consisting essentially of vinyl toluene, acrylonitrile and an ethylenically unsaturated carboxylic acid selected from the group consisting of acrylic acid, methacrylic acid and itaconic acid, the proportions of said monomer components on a mol equivalent basis being within the area A—C—D—F—A on the triangulation in FIGURE 1 and said copolymer having a relative viscosity measured at 25° C. in a 1 gram/100 ml. solvent solution in dimethyl formamide of from 1.4–3.5.

2. A primer as recited in claim 1 in which said acid is acrylic acid.

3. A primer for vinyl resin dispersions comprising an organic solvent solution of a copolymer of monomer components consisting essentially of vinyl toluene, acrylonitrile and an ethylenically unsaturated carboxylic acid selected from the group consisting of acrylic acid, methacrylic acid and itaconic acid, the proportions of said monomer components on a mol equivalent basis being within the area B—C—D—E—B on the triangulation in FIGURE 1 and said copolymer having a relative viscosity measured at 25° C. in a 1 gram/100 ml. solvent solution in dimethyl formamide of from 1.6–2.8.

4. A primer as recited in claim 3 in which said acid is acrylic acid.

5. A primer for vinyl resin dispersions comprising an organic solvent solution of a copolymer of monomer components consisting essentially of vinyl toluene, acrylonitrile and an ethylenically unsaturated carboxylic acid selected from the group consisting of acrylic acid, methacrylic acid and itaconic acid, the proportions of said monomer components on a mol equivalent basis being within the area A—C—D—F—A on the triangulation in FIGURE 1, said primer including titanium dioxide in an amount to provide a ratio of pigment to copolymer in said solution of from 0.1/1 to 1.5/1 and said copolymer having a relative viscosity measured at 25° C. in a 1 gram/100 ml. solvent solution in dimethyl formamide of from 1.4–3.5.

6. A primer as recited in claim 5 in which said titanium dioxide is present in an amount to provide a ratio of pigment to copolymer of from 0.15/1 to 1.1/1.

7. A primer for vinyl resin dispersions comprising an organic solvent solution of a copolymer of monomer components consisting essentially of vinyl toluene, acrylonitrile and an ethylenically unsaturated carboxylic acid selected from the group consisting of acrylic acid, methacrylic acid and itaconic acid, the proportions of said monomer components on a mol equivalent basis being within the area B—C—D—E—B on the triangulation in FIGURE 1, said primer including titanium dioxide in an amount to provide a ratio of pigment to copolymer in said solution of from 0.1/1 to 1.5/1 and said copolymer having a relative viscosity measured at 25° C in a 1 gram/100 ml. solvent solution in dimethyl formamide of from 1.6–2.8.

8. A primer as recited in claim 7 in which said titanium dioxide is present in an amount to provide a ratio of pigment to copolymer of from 0.15/1 to 1.1/1.

9. A primer for vinyl resin dispersions comprising an organic solvent solution of a copolymer of monomer components consisting essentially of vinyl toluene, acrylonitrile and an ethylenically unsaturated carboxylic acid selected from the group consisting of acrylic acid, methacrylic acid and itaconic acid, the proportions of said monomer components on a mol equivalent basis being within the area A—C—D—F—A on the triangulation in FIGURE 1, said primer including titanium dioxide in an amount to provide a ratio of pigment to copolymer in said solution of from 0.1/1 to 1.5/1 and up to 80% by weight of talc based on the weight of said titanium dioxide and said copolymer having a relative viscosity measured at 25° C. in a 1 gram/100 ml. solvent solution in dimethyl formamide of from 1.4–3.5.

10. A primer as recited in claim 9 in which the weight ratio of said titanium dioxide to said talc is about 60/40.

11. A primer for vinyl resin dispersions comprising an organic solvent solution of a copolymer of monomer components consisting essentially of vinyl toluene, acrylonitrile and an ethylenically unsaturated carboxylic acid selected from the group consisting of acrylic acid, methacrylic acid and itaconic acid, the proportions of said monomer components on a mol equivalent basis being within the area B—C—D—E—B on the triangulation in FIGURE 1, said primer including titanium dioxide in an amount to provide a ratio of pigment to copolymer in said solution of from 0.1/1 to 1.5/1 and up to 80% by weight of talc based on the weight of said titanium dioxide and said copolymer having a relative viscosity measured at 25° C. in a 1 gram/100 ml. solvent solution in dimethyl formamide of from 1.6–2.8.

12. A primer as recited in claim 11 in which the weight ratio of said titanium dioxide to said talc is about 60/40.

13. A primer for vinyl resin dispersions comprising an organic solvent solution of a copolymer of monomer components consisting essentially of vinyl toluene, acrylonitrile and an ethylenically unsaturated carboxylic acid selected from the group consisting of acrylic acid, methacrylic acid and itaconic acid, the proportions of said monomer components on a mol equivalent basis being within the area A—C—D—F—A on the triangulation in FIGURE 1, said primer including lead oxide in an amount to provide a ratio of pigment to copolymer in said solution of from 0.1/1 to 1.5/1 and up to 80% by weight of talc based on the weight of said lead oxide and said copolymer having a relative viscosity measured at 25° C. in a 1 gram/100 ml. solvent solution in dimethyl formamide of from 1.4–3.5.

14. A primer for vinyl resin dispersions comprising an organic solvent solution of copolymer of monomer components consisting essentially of vinyl toluene, acrylonitrile and an ethylenically unsaturated carboxylic acid selected from the group consisting of acrylic acid, methacrylic acid and itaconic acid, the proportions of said monomer components on a mol equivalent basis being within the area A—C—D—F—A on the triangulation in FIGURE 1, said copolymer having a relative viscosity measured at 25° C. in a 1 gram/100 ml. solvent solution in dimethyl formamide of from 1.4–3.5 and having a minimum fusion temperature of from 220–250° F.

15. A primer for vinyl resin dispersions comprising an organic solvent solution of a copolymer of monomer components consisting essentially of vinyl toluene, acrylonitrile and an ethylenically unsaturated carboxylic acid selected from the group consisting of acrylic acid, methacrylic acid and itaconic acid, the proportions of said monomer components on a mol equivalent basis being within the area B—C—D—E—B on the triangulation in FIGURE 1, said copolymer having a relative viscosity measured at 25° C. in a 1 gram/100 ml. solvent solution in dimethyl formamide of from 1.6–2.8 and a minimum fusion temperature of from 220–250° F.

16. A primer for vinyl resin dispersions comprising an organic solvent solution of a copolymer of monomer components consisting essentially of vinyl toluene, acrylonitrile and an ethylenically unsaturated carboxylic acid selected from the group consisting of acrylic acid, methacrylic acid and itaconic acid, the proportions of said monomer components on a mol equivalent basis being within the area B—C—D—E—B on the triangulation in FIGURE 1, said copolymer having a relative viscosity measured at 25° C. in a 1 gram/100 ml. solvent solution in dimethyl formamide of from 1.6–2.8 and a minimum fusion temperature of from 220–250° F., said primer including titanium dioxide in an amount to provide a ratio of pigment to copolymer in said solution of from 0.1/1 to 1.5/1.

17. A primer for vinyl resin dispersions comprising an organic solvent solution of a copolymer of monomer components consisting essentially of vinyl toluene, acrylonitrile and an ethylenically unsaturated carboxylic acid selected from the group consisting of acrylic acid, methacrylic acid and itaconic acid, the proportions of said monomer components on a mol equivalent basis being within the area A—C—D—F—A on the triangulation in FIGURE 1, said copolymer having a relative viscosity measured at 25° C. in a 1 gram/100 ml. solvent solution in dimethyl formamide of from 1.4–3.5 and said primer having a total solids content of from 20–40% by weight.

18. A primer as recited in claim 17 in which said organic solvent comprises methyl ethyl ketone.

19. A primer as recited in claim 17 in which said organic solvent comprises dimethyl formamide.

20. A primer as recited in claim 17 in which said organic solvent comprises cyclohexanone.

21. A sheet of steel having adhered thereto a film of primer comprising a copolymer of monomer components consisting essentially of vinyl toluene, acrylonitrile and an ethylenically unsaturated carboxylic acid selected from the group consisting of acrylic acid, methacrylic acid and itaconic acid, the proportions of said monomer components on a mol equivalent basis being within the area A—C—D—F—A on the triangulation in FIGURE 1, said copolymer having a relative viscosity measured at 25° C. in a 1 gram/100 ml. solvent solution in dimethyl formamide of from 1.4–3.5 and a topcoat adhered to said primer film, said topcoat comprising a fused layer of a polymer having a molecular weight above 20,000 and selected from the group consisting of polyvinyl chloride, copolymers of vinyl chloride with up to 10% by weight of vinyl acetate and copolymers of vinyl chloride with up to 10% by weight of vinylidene chloride.

22. A copolymer of monomer components consisting essentially of vinyl toluene, acrylonitrile and an ethylenically unsaturated carboxylic acid selected from the group consisting of acrylic acid, methacrylic acid and itaconic acid, the proportions of said monomer components on a mol equivalent basis being within the area A—C—D—F—A on the triangulation in FIGURE 1 and said copolymer having a relative viscosity measured at 25° C. in a 1 gram/100 ml. solvent solution in dimethyl formamide of from 1.4–3.5.

References Cited in the file of this patent
UNITED STATES PATENTS

| | | |
|---|---|---|
| 2,829,128 | Slocombe et al. | Apr. 1, 1958 |
| 2,873,212 | Roeser | Feb. 10, 1959 |